US 9,901,986 B2

(12) United States Patent
Makhlin et al.

(10) Patent No.: US 9,901,986 B2
(45) Date of Patent: Feb. 27, 2018

(54) SWISS TURNING INSERT WITH CHIP FORMER ARRANGEMENT COMPRISING UPWARDLY EXTENDING RIDGE

(71) Applicant: Iscar, Ltd., Tefen (IL)

(72) Inventors: Dima Makhlin, Nesher (IL); Sergey Chistyakov, Nahariya (IL)

(73) Assignee: Iscar, Ltd., Tefen (IL)

( * ) Notice: Subject to any disclaimer, the term of this patent is extended or adjusted under 35 U.S.C. 154(b) by 264 days.

(21) Appl. No.: 15/043,685

(22) Filed: Feb. 15, 2016

(65) Prior Publication Data

US 2017/0232524 A1   Aug. 17, 2017

(51) Int. Cl.
B23B 27/00 (2006.01)
B23B 27/16 (2006.01)
B23B 27/04 (2006.01)

(52) U.S. Cl.
CPC ........ *B23B 27/1622* (2013.01); *B23B 27/045* (2013.01); *B23B 2200/0485* (2013.01); *B23B 2200/081* (2013.01); *B23B 2200/321* (2013.01); *B23B 2220/24* (2013.01)

(58) Field of Classification Search
CPC ..... B23B 27/04; B23B 27/10; B23B 27/1614; B23B 27/1618; B23B 27/1644; B23B 27/1648; B23B 27/143; B23B 2205/04; B23B 2205/12; B23B 2200/369; B23B 2200/3618; B23B 29/043
See application file for complete search history.

(56) References Cited

U.S. PATENT DOCUMENTS

| 3,760,474 | A | 9/1973 | Stein | |
| 4,890,961 | A * | 1/1990 | Carl | B23B 27/04 407/105 |
| 4,992,007 | A | 2/1991 | Satran | |
| 5,725,334 | A | 3/1998 | Paya | |
| 6,146,064 | A | 11/2000 | Flolo | |
| 6,273,651 | B1 | 8/2001 | Heinloth et al. | |
| 7,904,006 | B2 | 3/2011 | Muramatsu | |
| 9,821,376 | B2 * | 11/2017 | Tsuda | B23B 27/145 |
| 2004/0086415 | A1 | 5/2004 | Gubanich et al. | |
| 2008/0240874 | A1 | 10/2008 | Nagaya et al. | |
| 2009/0162154 | A1 | 6/2009 | Jonsson et al. | |
| 2011/0110733 | A1* | 5/2011 | Hecht | B23B 27/1614 407/103 |
| 2014/0050542 | A1 | 2/2014 | Zeeb et al. | |
| 2014/0072379 | A1 | 3/2014 | Hecht | |
| 2014/0199128 | A1* | 7/2014 | Hecht | B23B 27/04 407/103 |
| 2014/0348601 | A1* | 11/2014 | Hecht | B23B 27/1622 407/104 |
| 2017/0066060 | A1 | 3/2017 | Tsuda | |

OTHER PUBLICATIONS

International Search Report dated May 24, 2017, issued in PCT counterpart application (No. PCT/IL2017/050133).
Written Opinion dated May 24, 2017, issued in PCT counterpart application (No. PCT/IL2017/050133).

\* cited by examiner

*Primary Examiner* — Will Fridie, Jr.
(74) *Attorney, Agent, or Firm* — Womble Bond Dickinson (US) LLP

(57) ABSTRACT

A swiss insert includes a chip former arrangement. The chip former arrangement includes a ridge separated on each side from a cutting edge's sub-edge by a chip surface. In a side view, each sub-edge extends in a straight line.

20 Claims, 4 Drawing Sheets

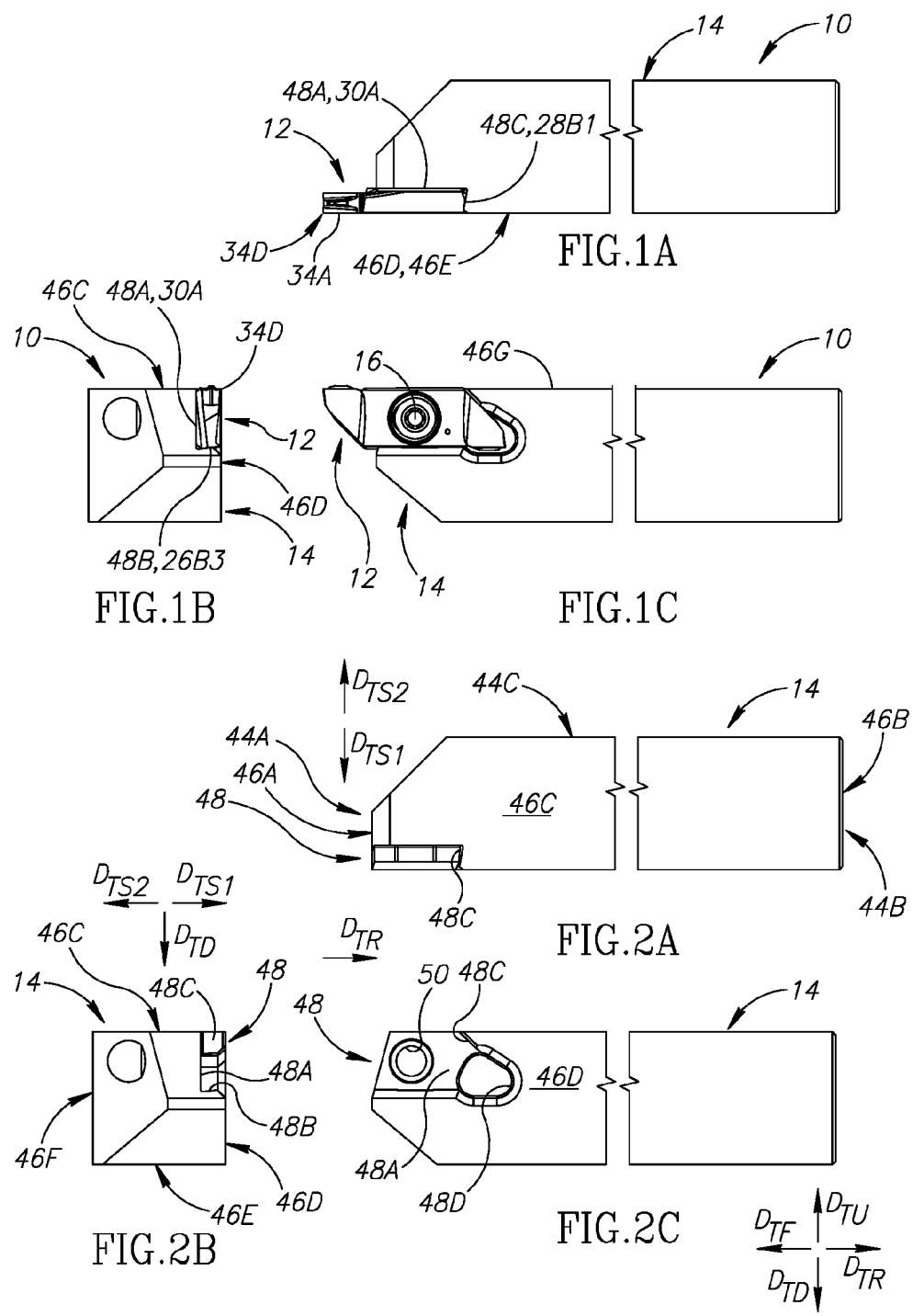

SWISS TURNING INSERT WITH CHIP FORMER ARRANGEMENT COMPRISING UPWARDLY EXTENDING RIDGE

FIELD OF THE INVENTION

The subject matter of the present application relates to swiss turning inserts (also referred hereinafter as "inserts") for precision machining, in particular with a chip former arrangement for turning machining and including a chip former arrangement including an upwardly extending ridge.

BACKGROUND OF THE INVENTION

Swiss turning inserts and tool holders are special purpose tools designed for use in swiss-style CNC machines (lathes) which are typically used for high precision machining applications.

High precision is achieved by the workpiece being held close to a bushing to minimize overhang of the workpiece (see, e.g., FIG. 4 of the present application).

The design of such inserts is limited by the requirement to machine very close to the bushing and other tool assemblies in a gang (see, e.g., FIGS. 5A and 5B of the present application). As shown in FIG. 5A, the upper right hand cutting edge of each swiss insert in the gang is typically in an identical position to the other tools of the gang. It will also be understood that the swiss inserts cannot overly extend in the vertical direction (i.e. meaning towards the tool assembly above or below) due to the close proximity of the adjacent tool assembly.

SUMMARY OF THE INVENTION

Due to the special workpiece holding arrangement of swiss-style CNC machines, swiss inserts with ridges are known to be configured to machine in one side direction only. The subject matter of the present application described below provides an additional second side direction machining capability. Since the workpiece is held at one end only, need for a second machining direction was only conceived for more rare instances. In such cases it is known to reposition the tool or workpiece for further machining. When the concept to modify the known ridge was conceived it was initially believed that such modification would be achieved at a disadvantage to functionality in the primary machining direction. Surprisingly, even in the primary direction, the modified ridge was found to provide equal or better finish results and tool life than other inserts tested comparatively. Additionally, it is believed features other than the ridge contribute in providing an extremely high finish as is the main goal of swiss-machining.

In accordance with a first aspect of the subject matter of the present application, there is provided a chip former arrangement for a swiss insert; the chip former arrangement comprising a cutting edge surrounding a ridge; the cutting edge comprising first and second sub-edges located on opposite sides of the ridge and connected by corner edges to a third sub-edge; the chip former arrangement further comprising first and second chip surfaces respectively located between the ridge and the first and second sub-edges.

In accordance with a second aspect of the subject matter of the present application, there is provided a chip former arrangement for a swiss insert; the chip former arrangement comprising a cutting edge surrounding a ridge; the cutting edge comprising first and second sub-edges following a straight line in a side view and located on opposite sides of the ridge and connected by corner edges to a third sub-edge; the chip former arrangement further comprising first and second chip surfaces respectively located between the ridge and the first and second sub-edges.

In accordance with a third aspect of the subject matter of the present application, there is provided a chip former arrangement for a swiss insert; the chip former arrangement comprising a cutting edge surrounding a ridge; the cutting edge comprising first and second sub-edges located on opposite sides of the ridge and connected by corner edges a third sub-edge inwardly recessed in a view along the downward direction.

In accordance with a fourth aspect of the subject matter of the present application, there is provided a swiss insert comprising the chip former arrangement according to any one of the first, second and third aspects.

The insert can be generally defined as inserts comprising cutting corners on opposite sides of a parallelepiped body portion. Preferably, for swiss inserts configured for use in gangs the parallelepiped body portion is a rectangular cuboid or rhombohedron. It is often preferred for there to be exactly two cutting corners (preferably with identical cutting edges and chip former arrangements) for the same reason.

While not essential, it is preferred that the swiss insert comprise exactly two cutting corners (i.e. comprising a cutting edge) at diagonally opposite portions of the insert.

Typically a swiss insert will have one or two screw holes opening out to opposite sides of the body portion.

Many of the features described herein are aimed at providing an improved finish, even comparatively higher than for workpieces machined using other CNC machines or methods.

Stated differently, a swiss insert can be defined as comprising: opposite insert first and second side surfaces; opposite insert upper and lower surfaces connecting the insert first and second side surfaces; opposite insert front and rear surfaces connecting the insert upper and lower surfaces and the insert first and second side surfaces; a first corner formed at an intersection of the first and second side surfaces and the insert upper and front surfaces; a second corner formed at an intersection of the first and second side surfaces and the insert upper and rear surfaces; a third corner formed at an intersection of the first and second side surfaces and the insert lower and front surfaces; a fourth corner formed at an intersection of the first and second side surfaces and the insert lower and rear surfaces; a screw hole opening out to the insert first and second side surfaces; an insert thickness axis extending perpendicular to, and extending through, the insert first and second side surfaces; an insert height axis extending perpendicular to the insert thickness axis, and extending through the insert upper and lower surfaces; an insert length axis extending orthogonal to the insert thickness and height axes, and extending through the insert front and rear surfaces; a maximum insert thickness measurable along the insert thickness axis; a maximum insert height measurable along the insert height axis and being greater than the maximum insert thickness; a maximum insert length measurable along the insert length axis and being greater than the maximum insert height; the insert height axis defining an upward direction from the center of the insert towards the insert upper surface, and defining a downward direction opposite to the upward direction; the insert thickness axis defining a first side direction from the center of the insert towards the insert first side surface, and defining a second side direction opposite to the first side direction; the insert length axis defining a forward direction from the center of the insert towards the insert front surface, and defining a rearward direction opposite to the forward direction; the first corner comprising a cutting edge; wherein adjacent to the cutting edge the insert's first and second side surfaces and front surface are configured as relief surfaces by: the first side surface tapering in a combined downward and second side direction; the second side surface tapering in a combined downward and first side direction; and the front surface tapering in a combined downward and rearward direction.

In accordance with a fifth aspect of the subject matter of the present application, there is provided a swiss insert comprising: opposite insert first and second side surfaces; opposite insert upper and lower surfaces connecting the insert first and second side surfaces; opposite insert front and rear surfaces connecting the insert upper and lower surfaces and the insert first and second side surfaces; a first corner formed at an intersection of the first and second side surfaces and the insert upper and front surfaces; a second corner formed at an intersection of the first and second side surfaces and the insert upper and rear surfaces; a third corner formed at an intersection of the first and second side surfaces and the insert lower and front surfaces; a fourth corner formed at an intersection of the first and second side surfaces and the insert lower and rear surfaces; a screw hole opening out to the insert first and second side surfaces; an insert thickness axis extending perpendicular to, and extending through, the insert first and second side surfaces; an insert height axis extending perpendicular to the insert thickness axis, and extending through the insert upper and lower surfaces; an insert length axis extending orthogonal to the insert thickness and height axes, and extending through the insert front and rear surfaces; a maximum insert thickness measurable along the insert thickness axis; a maximum insert height measurable along the insert height axis and being greater than the maximum insert thickness; a maximum insert length measurable along the insert length axis and being greater than the maximum insert height; the insert height axis defining an upward direction from the center of the insert towards the insert upper surface, and defining a downward direction opposite to the upward direction; the insert thickness axis defining a first side direction from the center of the insert towards the insert first side surface, and defining a second side direction opposite to the first side direction; the insert length axis defining a forward direction from the center of the insert towards the insert front surface, and defining a rearward direction opposite to the forward direction; the first corner comprising: a cutting edge, and a chip former arrangement formed at the upper surface; the cutting edge comprising: a first sub-edge extending along an intersection of the upper surface and the first side surface and following a straight line in a view along the second side direction; a second sub-edge extending along an intersection of the upper surface and the second side surface and following a straight line in a view along the first side direction; a third sub-edge extending along an intersection of the upper surface and the front surface; a first corner edge connecting the first sub-edge the third sub-edge; and a second corner edge connecting the second sub-edge the third sub-edge; the chip former arrangement comprising: a first chip surface adjacent to the first sub-edge and extending from the third sub-edge to a first rear chip edge, thereby defining a first cutting depth; a second chip surface adjacent to the first sub-edge and extending from the third sub-edge to a second rear chip edge, thereby defining a second cutting depth; a general cutting depth of the chip former arrangement being defined as (i) the smaller of the first and second cutting depths, or (ii) if the first and second cutting depths are equal, the depth of both the first and second cutting depths; and a ridge connected to the first and second chip surfaces, and comprising a ridge front end proximate to the third sub-edge and a ridge rear end located further than the ridge front end from the third sub-edge, the ridge extending in the upward direction from the location of the upper surface where the ridge and the first and second chip surfaces connect; wherein adjacent to the cutting edge the insert's first and second side surfaces and front surface are configured as relief surfaces by: the first side surface tapering in a combined downward and second side direction; the second side surface tapering in a combined downward and first side direction; and the front surface tapering in a combined downward and rearward direction.

In accordance with a sixth aspect of the subject matter of the present application, there is provided a chip former arrangement for a swiss insert; the chip former arrangement comprising a front cutting edge (called the "third sub-edge" hereinafter) being inwardly recessed in a view along the downward direction.

In accordance with a seventh aspect of the subject matter of the present application, there is provided a tool assembly comprising a swiss insert according to any of the previous aspects and an elongated tool comprising a single insert seat for holding the swiss insert.

In accordance with a eighth aspect of the subject matter of the present application, there is provided a gang comprising a plurality of tool assemblies according to the previous aspect.

In accordance with an ninth aspect of the subject matter of the present application, there is provided a method of machining a workpiece in a swiss-style CNC machine, comprising machining in a first side direction and subsequently in a second side direction.

Such swiss inserts and assemblies are particularly applicable for precision machining of metal workpieces, particularly made of steel, stainless steel, brass, copper and aluminium.

It will be understood that a swiss insert, according to any of the aspects above, can be configured to be held in a mounted position in an insert seat by a clamping force (e.g., one or more screws extending through one or more screw holes of the insert). Notably the mounting surfaces of the insert contacting the insert seat can be exactly the insert lower surface, the insert rear surface; and the insert second side surface (or more precisely, when such exists, the bearing configuration formed at the insert second side surface).

It will be understood that the above-said is a summary, and that any of the aspects above may further comprise any of the features described hereinbelow. Specifically, the following features, either alone or in combination, may be applicable to any of the above aspects:

i. A chip former arrangement can comprise a ridge. A chip former arrangement can comprise a cutting edge. Below are statements regarding an exemplary cutting edge and chip former arrangement is described in connection with an upper surface, however it will be understood that in all statements the term "upper surface" can be replaced with "lower surface".

ii. A chip former arrangement can comprise first and second chip surfaces.

iii. A chip former arrangement can comprise an intermediary plateau. The intermediary plateau can be located between a ridge front end and a third sub-edge. The intermediary plateau can be no higher than 100 microns above first and second sub-edges. The intermediary plateau can be planar shaped.

iv. A cutting edge can comprise first, second and third sub-edges and first and second corner edges.

v. An entire cutting edge can lie within a cutting edge plane having a height of less than 150 microns, preferably less than 100 microns.

vi. An entire cutting edge (or stated differently, each of the first, second and third sub-edges) can be devoid of a land.

vii. A first sub-edge can extend along an intersection of an upper surface and a first side surface and can follow a straight line in a view along the second side direction. A second sub-edge can extend along an intersection of an upper surface and a second side surface and following a straight line in a view along a first side direction. To elaborate, this means the first and/or second sub-edges can be straight along an entire cutting depth (e.g. from a third sub-edge until a rear chip edge). This is to achieve a suitable finish for turning applications. A general cutting depth is defined as the smaller, or if equal both, of first and second cutting depths. While the example, preferred, first and second sub-edges shown below extend parallel with a length axis, it will be understood that different applications may be better machined with such sub-edges being slanted relative to the length axis.

viii. The first and second sub-edges can lie within a cutting edge plane, preferably having a height of less than 10 microns.

ix. First and second sub-edges can be located on located on opposite sides of a surface.

x. A third sub-edge can extend along an intersection of an upper surface and a front surface.

xi. A third sub-edge can be inwardly recessed in a view along the downward direction. It will be understood that this can provide an advantageous relief during turning operations. In a preferred design, in a view along the downward direction, the third sub-edge can comprise both curved and straight portions connected by discontinuity points. Even though a non-smooth edge reduces finish and tool life, additional capability achieved was found to offset the known disadvantage.

xii. First and second sub-edges can be connected by corner edges a third sub-edge. The first, second and third sub-edges and the corner edges, can extend continuously along a surface of a corner of an insert.

xiii. A first corner edge can connect a first sub-edge and a third sub-edge.

xiv. A second corner edge can connect a second sub-edge and a third sub-edge.

xv. One or both of first and second corner edges can comprise: a wiper portion connected to the third sub-edge and extending, in a view along the downward direction, in a straight line extending at a right angle with a nearer of first and second sub-edges. In such case it is preferred that the third sub-edge is inwardly recessed in a view along the downward direction. Stated differently, both wiper portions of the first and second corner edges can lie in a front edge plane which extends perpendicular to the first and second sub-edges and the third sub-edge can be entirely located rearward of the front edge plane (i.e. the third sub-edge can be rearwardly recessed relative to the wiper portions). The inward recessing can have a curved form in a view along the downward direction.

xvi. One or both of first and second corner edges can comprise a convexly shaped portion. Each convexly curved shaped portion can be connected at a first end to a nearer of the first and second sub-edges and at a second end to a wiper portion.

xvii. A ridge connected to first and second chip surfaces. It will be understood that by providing chip surfaces on both sides of a ridge this can facilitate machining along two opposite side directions.

xviii. A ridge can be surrounded by a cutting edge, except in a rearward direction. Stated differently the ridge can be surrounded on three out of four sides thereof. Stated differently, a ridge can be surrounded by a cutting edge in each cutting direction of the cutting insert.

xix. A ridge can comprise a ridge front end proximate to a third sub-edge and a ridge rear end located further than the ridge front end from the third sub-edge.

xx. A ridge front end can comprises a concave front portion opening up in a forward direction. While recessing the ridge from a third sub-edge is believed to reduce tool life, it has been found to be advantageous for machining ductile materials, and considering that machining along the forward direction is a secondary machining process, a detriment of such reduced tool life was determined to be offset by the additional capability.

xxi. A ridge can extend in an upward direction. More precisely a ridge can extend upward from a location of the upper surface where the ridge and first and second chip surfaces connect.

xxii. In a view along each of the first and second insert side directions, a ridge can have a basic convex shape. To elaborate, the convex shape can include the ridge front end tapering in a combined forward and downward direction and the ridge rear end tapering in a combined rearward and downward direction.

xxiii. A ridge rear end can have a planar shape.

xxiv. A ridge can be elongated in a direction parallel to an insert length axis. Even though It will be noted that the ridge has been configured with a comparatively long length (close to the a length of the entire corner) to suit swiss machining applications which have been found to produce better results with relatively slow machining speeds at relatively large depths.

xxv. A ridge can comprise first and second concave side portions connecting the ridge to the chip surfaces. The first concave side portion can open up in a first side direction and a second concave side portion can open up in a second side direction.

xxvi. A width of the ridge, in view along the rearward direction and at a height above the first and second side sub-edges, can be less than half an overall thickness between the first and second side sub-edges measured along the thickness axis.

xxvii. A front spacing length between a third sub-edge and a ridge front end, measurable along the insert length axis, can be at least 5% of a general cutting depth of the chip former arrangement. A front spacing length can be 10%±5% of the general cutting depth.

xxviii. A rear spacing length between where the ridge rear end starts tapering in said combined rearward and downward direction, and a rear edge plane is at least 5% of a general cutting depth of the chip former arrangement. A rear spacing length can be 15%±10% of the general cutting depth. A rear edge plane extends parallel with both the thickness and height axes and intersects the rearmost, or if equal both, of first and second rear chip edges.

xxix. A first chip surface can be located adjacent to a first sub-edge. A first chip surface can extend from a third sub-edge to a first rear chip edge. A first chip surface can define a first cutting depth from a third sub-edge to a first rear chip edge.

xxx. A second chip surface can be located adjacent to a second sub-edge. A second chip surface can extend from a third sub-edge to a second rear chip edge. A second chip surface can define a second cutting depth from a third sub-edge to a second rear chip edge.

xxxi. In a view along the downward direction, one or both of first and second chip surfaces can have a tapering shape. To elaborate, this means the tapering shape is along an entire cutting depth (e.g. from a third sub-edge until a rear chip edge). Each tapering shape can preferably be wider adjacent to a third sub-edge than at another position spaced further apart from the third sub-edge.

xxxii. One or both of first and second chip surfaces can have a planar shape (stated differently "planar shape/d" in this application means "lying within a plane"). Preferably, each chip surface can be ground.

xxxiii. One or both of first and second chip surfaces can form a side angle α with a thickness plane defined by the intersection of the length and thickness axes, the side angle α fulfilling the following condition: $-15° < α < 15°$. Preferably, particularly for machining metal, the side angle is: $0° < α < 16°$. Tested results with a value of α equal to 8° have been particularly successful. Accordingly, a most preferred side angle is: $4° < α < 12°$.

xxxiv. An insert can comprise cutting corners on opposite sides of a parallelepiped body portion. The parallelepiped body portion can preferably be a rectangular cuboid or rhombohedron.

xxxv. An insert can comprise exactly two cutting corners. The exactly two cutting corners can preferably be located at diagonally opposite portions of the insert.

xxxvi. An insert's corner can comprise a cutting edge, and a chip former arrangement formed at the upper surface.

xxxvii. An insert can be formed with at least one screw hole, most preferably exactly one or two screw holes, opening out to opposite sides of the body portion (i.e. a portion located between cutting corners of the insert). Stated differently, the screw hole(s) can open out to insert first and second side surfaces. In a case where there is a single screw hole, it can be in the center of the insert. In such case a thickness axis can also constitute a screw hole axis. In a case where there are exactly two screw holes, they can preferably be adjacent to each other along the length axis.

xxxviii. An insert can comprise opposite insert first and second side surfaces.

xxxix. At a cutting corner, each of the first and second side surfaces, and front surface can be planar shaped, preferably ground.

xl. An insert can comprise opposite insert upper and lower surfaces. The insert upper and lower surfaces can connect insert first and second side surfaces. The insert upper surface can extend rearwardly from a first upper end to a second upper end. The insert lower surface can extend rearwardly from a first lower end to a second lower end.

xli. The lower surface can be slanted for secure mounting. To elaborate, for example, the lower surface can be slanted such that in a second side direction the lower surface extends further from a center of the insert. Both of the insert upper and lower surfaces being slanted (each slanted surface being for a different indexed position of the insert). The upper surface can be slanted such that in a second side direction the upper surface extends further from a center of the insert (of course the upper surface functions as the lower surface after indexing).

xlii. An insert can comprise opposite insert front and rear surfaces. The insert front and rear surfaces can connect insert upper and lower surfaces. The insert front and rear surfaces can connect insert first and second side surfaces. The insert front surface can taper in a combined rearward and downward direction from the first upper end to the first lower end. The insert rear surface can taper in a combined rearward and downward direction from the second upper end to the second lower end.

xliii. An insert can comprise first, second, third and fourth corners. One or more of the corners can be cutting corners (i.e. configured with a chip former arrangement). Preferably exactly two corners are cutting corners. The first corner can be formed at an intersection of first and second side surfaces and insert upper and front surfaces. The second corner can be formed at an intersection of first and second side surfaces and insert upper and rear surfaces. The third corner can be formed at an intersection of first and second side surfaces and insert lower and front surfaces. The fourth corner can be formed at an intersection of first and second side surfaces and insert lower and rear surfaces.

xliv. An insert thickness axis can extend perpendicular to, and extend through, insert first and second side surfaces.

xlv. A maximum insert thickness can be measurable along an insert thickness axis.

xlvi. An insert height axis can extend perpendicular to an insert thickness axis, and can extend through the insert upper and lower surfaces.

xlvii. A maximum insert height can be measurable along an insert height axis. The maximum insert height can be greater than a maximum insert thickness.

xlviii. An insert height axis can define an upward direction from a center of an insert towards an insert upper surface. An insert height axis can define a downward direction opposite to the upward direction. Alternatively, an insert height axis can define a downward direction from a center of an insert towards an insert lower surface.

xlix. An insert length axis can extend orthogonal to an insert thickness and height axes, and can extend through the insert front and rear surfaces.

l. An insert thickness axis can define a first side direction from a center of an insert towards an insert first side surface. An insert thickness axis can define a second side direction opposite to the first side direction. Alternatively, an insert thickness axis can define a second side direction from a center of an insert towards an insert second side surface.

li. A maximum insert length can be measurable along an insert length axis. The maximum insert length can be greater than a maximum insert height.

lii. An insert length axis can define a forward direction from a center of an insert towards an insert front surface. An insert length axis can define a rearward direction opposite to the forward direction. Alternatively, an insert length axis can define a rearward direction from a center of an insert towards an insert rear surface.

liii. A length plane, or more precisely the location and orientation thereof, can be defined by the length and height axes lying therein. Stated more simply, with terminology that will be used hereinafter, the length plane can be defined by the insert length axis and the insert height axis. Similarly, a thickness plane can be defined by a insert thickness axis and the insert length axis. Also, a height plane can be defined by the insert height axis and the insert thickness axis.

liv. A corner can have all surfaces thereof, excluding a surface comprising a chip former arrangement, configured as relief surfaces (at least at portions thereof adjacent to a cutting edge). For example, adjacent to a cutting edge an insert's first and second side surfaces and front surface can be configured as relief surfaces. For example: the first side surface can taper in a combined downward and second side direction; the second side surface can taper in a combined downward and first side direction; and the front surface can taper in a combined downward and rearward direction.

lv. The front surface, at a front abutment portion thereof spaced apart from the cutting edge, can be slanted in a combined downward, rearward and first side direction. The front abutment portion can be planar shaped, preferably ground. The rear surface comprises a correspondingly slanted rear abutment portion.

lvi. A method of machining can comprise machining in a first side direction and subsequently in a second side direction (e.g. parallel with a thickness axis of an insert). The method can further comprise machining in an axial direction (e.g. along a length axis of an insert).

lvii. An insert can comprise a bearing configuration formed at a second side surface only. Stated differently, the first side surface can be devoid of a bearing configuration. The bearing configuration can comprise an outer planar shaped surface, preferably ground. The outer surface can extend parallel with a length plane formed along the length and height axes.

lviii. The insert can be mirror symmetric on both sides of a length plane except for bearing configuration. The bearing configuration can extend in a second side direction past the mirror symmetric portion of the insert.

lix. An insert can be rotationally symmetric only at an angle of 180° about an axis parallel with the thickness axis and extending through the center of the insert.

lx. A cutting corner can be symmetric along a length plane.

lxi. An insert can be configured to be mounted with only the lower surface, the rear surface (or, stated more precisely for designs having such, a rear abutment portion of the rear surface) and the second side surface (or bearing configuration formed thereat) contacting corresponding surfaces of an insert seat.

BRIEF DESCRIPTION OF THE DRAWINGS

For a better understanding of the subject matter of the present application, and to show how the same may be carried out in practice, reference will now be made to the accompanying drawings, in which:

FIG. 1A is a view along a downward direction (hereinafter also called a "top view") of a tool assembly;

FIG. 1B is a view along a rearward direction (hereinafter also called a "front end view") of the tool assembly in FIG. 1A;

FIG. 1C is a view along a side direction (hereinafter also called a "side view") of the tool assembly in FIG. 1A;

FIG. 2A is a top view of a tool of the tool assembly in FIG. 1A;

FIG. 2B is a front end view of the tool in FIG. 2A;

FIG. 2C is a side view of the tool in FIG. 2A;

DETAILED DESCRIPTION

Referring to FIG. 1A to 1C, illustrated is a tool assembly 10 comprising an insert 12, a tool 14 and a screw 16 for securing the insert 12 to the tool 14.

Figure 3A:
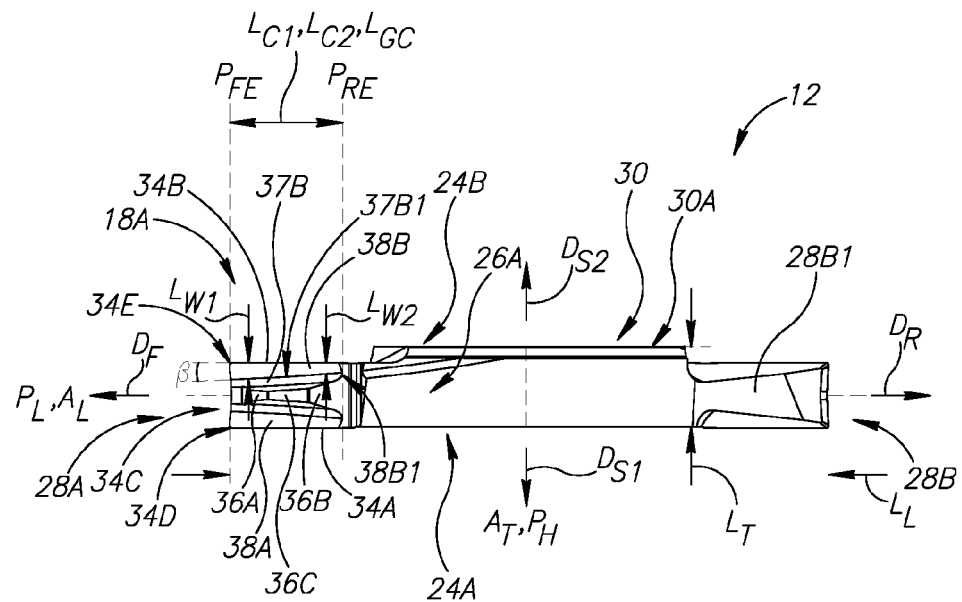
FIG. 3A is a top view of an insert of the tool assembly in FIG. 1A (i.e. this is a view along a downward direction, noting that an identical view, except rotated 180°, would be shown along an upward direction)
Figures 3B, 3C:
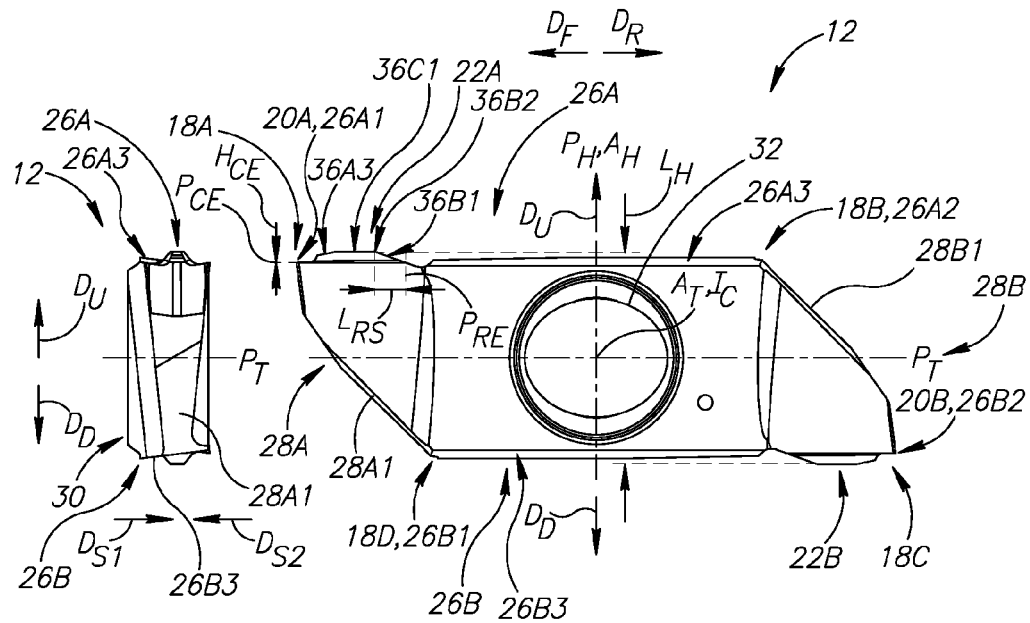
FIG. 3B is a front end view of the insert in FIG. 3A (i.e. this is a view along a rearward direction, noting that an identical view, except rotated 180°, would be shown along a forward direction)
FIG. 3C is a side view of the insert in FIG. 3A (i.e. this is a view along a second side direction)

Referring to FIGS. 3A to 3C, the insert 12 can comprise first, second, third and fourth corners 18A, 18B, 18C, 18D. The first and third corners 18A, 18C, in this example, are cutting corners, meaning that each such corner comprises a cutting edge 20A, 20B and a chip former arrangement 22A, 22B.

Insert thickness, height and length axes $A_T$, $A_H$, $A_L$ extend through insert first side, second side, upper, lower, front and rear surfaces 24A, 24B, 26A, 26B, 28A, 28B, and define upward, downward, first side, second side, forward and rearward directions $D_U$, $D_D$, $D_{S1}$, $D_{S2}$, $D_F$, $D_R$ and thickness, height and length planes $P_T$, $P_H$, $P_L$. Maximum insert thickness, height and lengths $L_T$, $L_H$, $L_L$ are measured parallel to the insert thickness, height and length axes $A_T$, $A_H$, $A_L$, respectively.

The insert upper surface 26A could also be described as extending rearwardly from a first upper end 26A1 to a second upper end 26A2. As best shown in FIG. 3B, at least an upper abutment portion 26A3 of the insert upper surface 26A can be slanted in the upward and second directions $D_U$, $D_{S2}$. It will be understood hereinafter, that the insert upper surface 26A is only used for contacting the tool 14 after indexing thereof.

The insert lower surface 26B could also be described as extending rearwardly from a first lower end 26B1 to a second lower end 26B2. At least a lower abutment portion 26B3 of the insert lower surface 26B can be slanted in the downward and second side directions $D_D$, $D_{S2}$.

The second side surface 24B can be formed with a bearing configuration generally designated 30. The bearing configuration 30 can comprise a planar shaped bearing surface 30A, extending parallel with the length plane $P_L$ and preferably is ground for precision mounting of the insert 12 to the tool 14.

The insert front surface 28A can be generally described as tapering in the downward and rearward directions $D_D$, $D_R$ from the first upper end 26A1 to the first lower end 26B1. Additionally, at a front abutment portion 28A1 which is spaced apart from the cutting edge 20A can be further defined as being slanted in a combined downward, rearward and first side direction $D_U$, $D_R$, $D_{S1}$.

The insert rear surface 28B comprises a correspondingly construction to the insert front surface 28A, bearing in mind the rotational symmetry of the insert 12. To elaborate, the insert rear surface 28B comprises a slanted rear abutment portion 28B1 being slanted in a combined downward, rearward and first side direction $D_U$, $D_R$, $D_{S1}$.

A screw hole 32 opens out to both the insert first and second side surfaces 24A, 24B. In cases where the screw hole 32 is centrally located in the first and second side surfaces 24A, 24B, the insert thickness axis $A_T$ also can also extends through a center $I_C$ of the insert 12 and can constitute a central axis (which in this case is also the insert thickness axis $A_T$, and also constitutes a screw axis in this case) about which the insert 12 can be indexed. Stated differently the insert 12 can be rotationally symmetric by exactly and only 180° about the central axis, which in this case is coaxial with the insert thickness axis $A_T$.

Since both the first and third corners 18A, 18C are identical, only the first corner 18A will be described hereinafter.

As shown in FIG. 3A, the cutting edge 20A can continuously extend around the upper surface of first corner 18A, comprising a first sub-edge 34A, a second sub-edge 34B and a third sub-edge 34C, the first and third sub-edges 34A, 34C connected by a first corner edge 34D, and the second and third sub-edges 34B, 34C connected by a second corner edge 34E.

It is preferred that the first and second sub-edges 34A, 34B are substantially parallel. For example, in FIG. 3B it is noted that both the first and second sub-edges lie within a cutting edge plane $P_{CE}$ having a height $H_{CE}$ of 10 microns. It will be understood that each statement in the present application of a plane having a height (or corresponding dimension if the plane is oriented differently) could alternatively be stated as the elements specified as being within a certain distance of a plane having a theoretical height of zero. To explain by way of example, if the cutting edge plane $P_{CE}$ has a theoretical height $H_{CE}$ of zero, both the first and second sub-edges 34A, 34B extend less from the cutting edge plane $P_{CE}$ than a distance of: ±5 microns.

Similarly, the entire cutting edge 20A can preferably lie within the cutting edge plane $P_{CE}$ should it have a height $H_{CE}$ of 150 microns, more preferably 100 microns. Stated differently, the cutting edge can extend no further from the cutting edge plane $P_{CE}$ (assuming it has a theoretical height $H_{CE}$ of zero) than a distance of: ±75 microns, or more preferably ±50 microns.

Figure 3D:
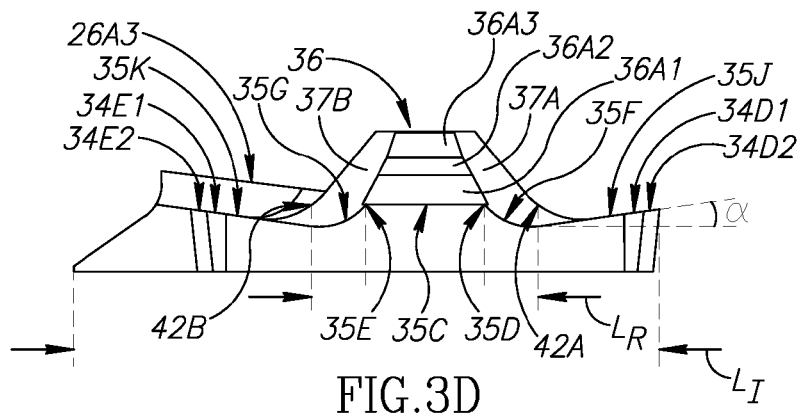
FIG. 3D is an enlarged partial front end view of the insert as shown in FIG. 3B.
Figure 3E:
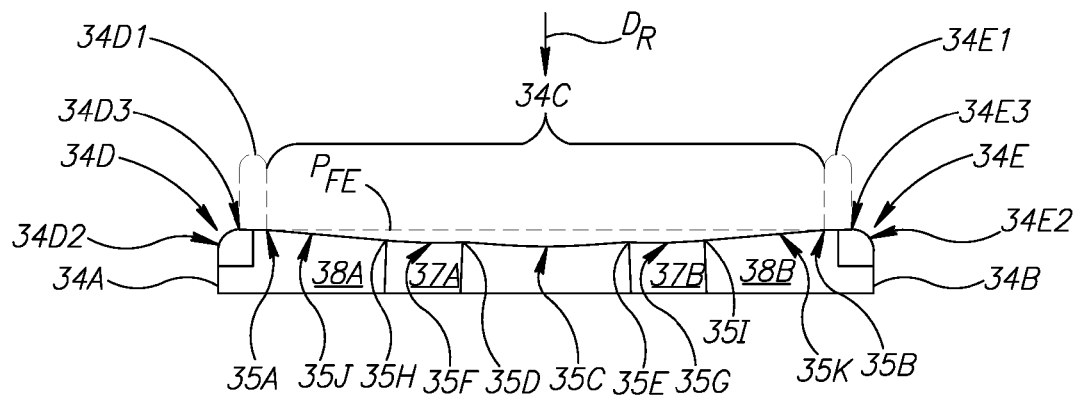
FIG. 3E is an enlarged partial top view of the left hand side of the insert as shown in FIG. 3A.

Referring specifically to FIG. 3E, it is illustrated that the first corner edge 34D can comprise a first wiper portion 34D1 connected to a first corner portion 34D2 at a first corner discontinuity point 34D3. The second corner edge 34E can comprise a second wiper portion 34E1 connected to a second corner portion 34E2 at a second corner discontinuity point 34E3.

Each of the first and second wiper portions 34D1, 34E1 can form a right angle (e.g., the first wiper portion being exemplified in FIG. 3E with a right angle symbol) with a nearer of the first and second sub-edges 34A, 34B as illustrated.

The first and second wiper portions 34D1, 34E1 connect to the third sub-edge 34C at first and second discontinuity points 35A, 35B which constitute extremity points thereof.

Between the first and second discontinuity points 35A, 34B the third sub-edge 34C extend inwardly (i.e. in the view shown in FIG. 3E and towards the rearward direction $D_R$). Notably, the third sub-edge 34C can be, in its entirety, rearwardly located of a front edge plane $P_{FE}$ along which the first and second wiper portions 34D1, 34E1 lie.

The third sub-edge 34C can further comprise, in a view along the downward direction (FIG. 3E), a central portion 35C which is concavely shaped in this view and extends to third and fourth discontinuity points 35D, 35E. However, the central portion 35C, in a view along the rearward direction (FIG. 3D) nonetheless extends in a straight line, preferably parallel with the thickness plane $P_T$.

To further describe the third sub-edge 34C in the view shown in FIG. 3D, it is noted that the chip former arrangement 22A comprises a ridge 36 which in turn comprises first and second concave side portions 37A, 37B, which will be described further hereinafter.

At the third sub-edge 34C, the concave side portions 37A, 37B form first and second front concave edge portions 35F, 35G shown to be concave along both the rearward direction (i.e. the view shown in FIG. 3D) and along the downward direction (i.e. the view shown in FIG. 3E). The first and second front concave edge portions 35F, 35G respectively extend from the third and fourth discontinuity points 35D, 35E to fifth and sixth discontinuity points 35H, 35I (the latter being visible in only a view along the downward direction).

At the third sub-edge 34C, the first and second chip surfaces 38A, 38B form first and second straight edge portions 35J, 35K shown to be straight both the rearward direction (i.e. the view shown in FIG. 3D).

The first straight edge portion 35J extends from the first discontinuity point 35A to the fifth discontinuity point 35H.

The second straight edge portion 35K extends from the second discontinuity point 35B to the sixth discontinuity point 35I.

Additionally, as shown in this view, both of first and second first corner portions 34D2 34E2 are convexly shaped portions (rather than a possible alternative of sharp angled corners).

It will be noted that both the non-smooth path of the third sub-edge 34C, or stated differently the different heights thereof when viewed in both the rearward and downward directions can be advantageous in destabilization of workpiece chips, by causing different portions thereof to deflect in different directions (for causing chip breakage at a desired length).

Directing attention to all of FIGS. 3A to 3F, the first chip former arrangement 22A can comprise the first and second chip surfaces 38A, 38B the ridge 36 connected to the first and second chip surfaces 38A, 38B, and an intermediary plateau 40 (the intermediary plateau is present as a result of a preferred production method and is devoid of a chip forming function).

Since both of the first and second chip surfaces 38A, 38B in this example are mirror-symmetric about the length plane $P_L$ some features below are described with reference to only one of the chip surfaces but should be understood to apply to both.

Drawing particular attention to FIG. 3A, the second chip surface 38B can comprise a first rear chip edge 38B 1. Along a direction parallel with the length axis $A_L$, there is defined a second cutting depth $L_{C2}$ from the third sub-edge 34C to the second rear chip edge 38B1. In a direction parallel with the thickness axis the second chip surface 38B extends from the second sub-edge 34B to the start of the ridge 36. The ridge 36 is defined as starting at an upwardly extending part of the upper surface (in this case, the start of the upwardly extending part is the start 37B1 of the second concave side portion 37B, illustrated by an imaginary curvature line in FIG. 3A).

A general cutting depth $L_{GC}$ is defined as the smaller of the first and second cutting depths $L_{C1}$, $L_{C2}$. In this case, the first and second cutting depths $L_{C1}$, $L_{C2}$ are equal and hence the general cutting depth $L_{GC}$ is equal to both of them.

In a view along the downward direction (FIG. 3A), both of first and second chip surfaces 38A, 38B can have a tapering shape wider adjacent to the third sub-edge 34C than at another position spaced further apart therefrom (see, e.g., first and second widths $L_{W1}$, $L_{W2}$, where the first width $L_{W1}$ is nearer to the third sub-edge 34C and is greater in magnitude than the second width $L_{W2}$). A chip taper angle 3 can preferably be 4°±2°. Such tapering can be advantageous in destabilization of workpiece chips, by causing different portions thereof to deflect in different directions (intended to cause chip breakage at a desired length).

Referring now particularly to FIG. 3D, the first and second chip surfaces 38A, 38B can each form a side angle α, which this example is 8°.

In the same rearward view, a width $L_R$ of the ridge, measurable between ridge extremity points 42A, 42B (which in this case correspond with the same position along the thickness axis as the starting points of the first and second concave portions at the third sub-edge) is less than half an overall insert thickness $L_1$.

Reverting to FIG. 3A, the ridge 36 can comprise a ridge front end 36A, a ridge rear end 36B and an intermediary portion 36C extending therebetween.

The ridge front end 36A can comprise a concave front portion 36A1, a front first planar portion 36A2, and a front second planar portion 36A3 connecting the concave front portion 36A1 and the front second planar portion 36A2.

An upper rear surface 36B1 of the ridge rear end 36B can be planar shaped.

At least an upper surface 36C1 of the intermediary portion 36C can be connected between the front second planar portion 36A3 and the upper rear surface 36B1.

As understood best from the view in FIG. 3C, the ridge rear end 36B can extend in both the downward and rearward directions.

Figure 3F:
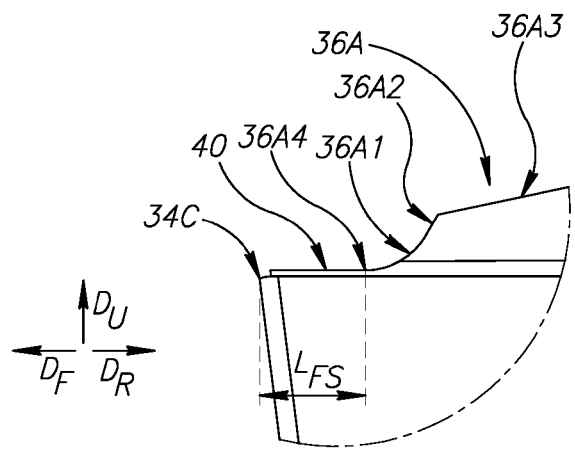
FIG. 3F is an enlarged partial side view of the left hand side of the insert as shown in FIG. 3C.

As best shown in FIG. 3F, at least the frontmost portion of the ridge front end 36A (e.g. a ridge discontinuity point 36A4 at which the concave front portion 36A1 and the intermediary plateau 40 meet) of the ridge 36 can extend in the upward and rearward directions $D_U$, $D_R$. Accordingly, shown by the full ridge 36 in FIG. 3C, the ridge 36 can have a basic convex shape. Such shape can be advantageous in destabilization of workpiece chips, by causing different portions thereof to deflect in different directions (intended to cause chip breakage at a desired length).

Referring now to FIG. 3F, while it may be advantageous for machining in the side directions for the front edge of the ridge to extend until the third sub-edge (thereby extending more alongside the main cutting sub-edges of the cutting edge, i.e. the first and second sub-edges), the ridge front end 36A is recessed in this view. This provides an advantage for machining in an axial direction (i.e. in the forward direction $D_F$) in particular for ductile materials. Even though machining in the side directions constitutes the overwhelming majority of machining, it was found that such feature did not significantly detriment performance. To elaborate, a front spacing length $L_{FS}$ between the third sub-edge 34C and the start of the ridge front end (i.e. in this example the ridge discontinuity point 36A4) of a ridge, measurable along the insert length axis, can be at least 5% of a general cutting depth $L_{GC}$ (FIG. 3A).

Referring now to FIG. 3C, in order to achieve both the ridge's 36 destabilization effect, together with the normal deflection function alongside most of the main cutting edge 22A (i.e. alongside the first and second sub-edges), the ridge rear end 36B can descend only close to a reach chip edge. To elaborate a rear spacing length $L_{RS}$ between where the ridge rear end 36B2 starts, and a rear edge plane $P_{RE}$ is at least 5% of the general cutting depth $L_{GC}$. As seen from FIGS. 3A and 3C, this rear edge plane $P_{RE}$ is parallel to the height plane ($P_H$) and is spaced apart from the third sub-edge 34C by said general cutting depth ($L_{GC}$).

Directing attention to FIGS. 2A to 2C, a tool 14 is shown. The tool 14 comprises front and rear tool ends 44A, 44B and an elongated body 44C extending therebetween. To elaborate, the tool 14 can have tool front and rear surfaces 46A, 46B first, second, third and fourth tool sides surfaces 46C, 46D, 46E, 46F extending at right angles to each other and between the tool front and rear surfaces 46A, 46B.

The tool 14 also defines tool upward, downward, first side, second side, forward and rearward directions $D_{TU}$, $D_{TD}$, $D_{TS1}$, $D_{TS2}$, $D_{TF}$, $D_{TR}$.

The tool can comprise a single insert seat 48 at the front tool end 44A. More precisely the insert seat 48 can be formed at an intersection of the tool front surface 46A and first and second tool side surfaces 46C, 46D.

The insert seat 48 can comprise a tool first abutment surface 48A and at least one internally threaded tool bore 50 formed therein.

The tool first abutment surface 48A can extend parallel, or substantially parallel, with the second tool side surface 46D. The tool first abutment surface 48A, or at least portions thereof, can be planar shaped for precise mounting of an insert 12.

The insert seat 48 can further comprise tool second and third abutment surfaces 48B, 48C separated by a relief recess 48D, all of which extend along a periphery of the tool first abutment surface.

The tool second abutment surface 48B can extend in the tool rearward direction $D_{TR}$ from the tool front surface 46A. As shown in FIG. 2B, the tool second abutment surface 48B is also inwardly slanted, i.e. extending in the tool downward and second side directions $D_{TD}$, $D_{TS2}$ to assist in securely clamping the insert 12 against the tool 14.

The tool third abutment surface 48C can also be slanted for better clamping. As shown it can extend in the tool rearward, second side and downward directions $D_{TR}$, $D_{TS2}$, $D_{TD}$.

Stated differently, each of the following pairs of surfaces are mutually inclined: the tool first abutment surface 48A and the insert's second side surface 24B (or more precisely, the bearing configuration's 30 bearing surface 30A); the tool second abutment surface 48B and the insert lower surface 26B (or more precisely, the lower abutment portion 26B3 thereof); and the tool third abutment surface 48C and the insert rear surface 28B (or more precisely, the rear abutment portion 28B1 thereof).

Directing attention to FIG. 1A to 1C, the insert 12 is shown in a clamped position in the insert seat 48, with all clamping contact between the insert and tool being by the following surfaces: the tool first abutment surface 48A and the insert's second side surface 24B (or more precisely, the bearing configuration's 30 bearing surface 30A); the tool second abutment surface 48B and the insert lower surface 26B (or more precisely, the lower abutment portion 26B3 thereof); and the tool third abutment surface 48C and the insert rear surface 28B (or more precisely, the rear abutment portion 28B1 thereof). The clamping further includes a clamping force, provided in this example by the screw 16.

For swiss machining, it will be noted from the view of FIG. 1B that the first corner edge 34D is preferably aligned with both the first and second tool side surfaces 46C, 46D.

Similarly, the first sub-edge 34A can be aligned with the common edge of the tool second side surface 46D in both FIGS. 1A and 1B.

Figure 4:
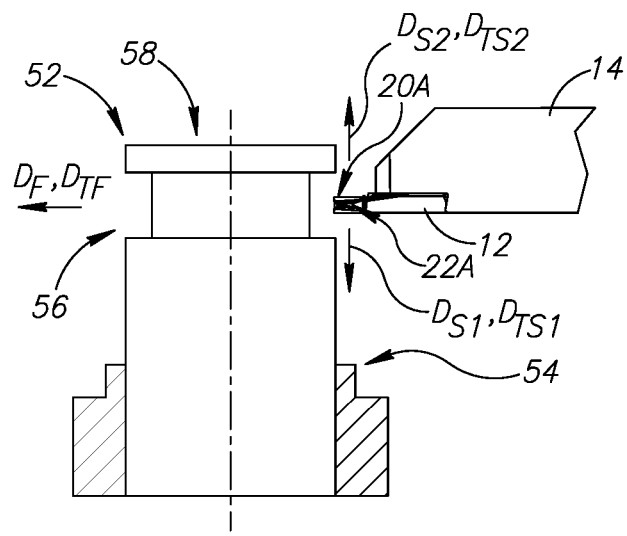
FIG. 4 is a partial top view of the tool assembly in FIG. 1A and a workpiece held by a partially shown bushing in a configuration typical of a swiss-style CNC machine.

Referring to FIG. 4, a metal workpiece 52 is shown clamped in a typical manner for swiss-style CNC machines (not shown). Notably, the workpiece 52 is held by a bushing 54 adjacent to a portion 56 of the workpiece 52 being machined, with an end 58 of the workpiece 52 being unsecured.

It will be understood that the first cutting edge 20A and chip former arrangement 22A according to the present application allow machining in both first and second side directions $D_{S1}$, $D_{S2}$ shown as well as in an axial direction (i.e. the forward direction $D_F$, $D_{TF}$).

Figures 5A, 5B:
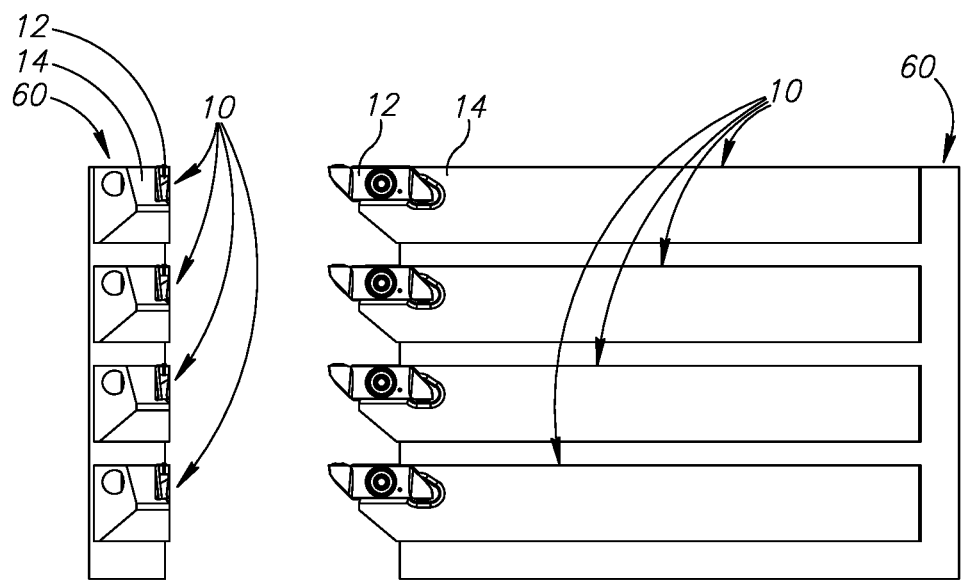
FIG. 5A is a front view of a gang comprising four tool assemblies of the type in FIG. 1A.
FIG. 5B is a side view of the gang in FIG. 5A.

FIGS. 5A and 5B are shown to demonstrate a typical gang 60 of four swiss tool assemblies 10 (i.e. a tool assembly 10 comprising an insert 12 and a tool 14). It will be understood from the closely packed arrangement why inserts 12 of other types are not useable in such gangs 60.

What is claimed is:
1. A swiss insert comprising:
opposite insert first and second side surfaces;
opposite insert upper and lower surfaces connecting the insert first and second side surfaces;
opposite insert front and rear surfaces connecting the insert upper and lower surfaces and the insert first and second side surfaces;
a first corner formed at an intersection of the first and second side surfaces and the insert upper and front surfaces;
a second corner formed at an intersection of the first and second side surfaces and the insert upper and rear surfaces;
a third corner formed at an intersection of the first and second side surfaces and the insert lower and front surfaces;
a fourth corner formed at an intersection of the first and second side surfaces and the insert lower and rear surfaces;
a screw hole opening out to the insert first and second side surfaces;
an insert thickness axis ($A_T$) extending perpendicular to, and extending through, the insert first and second side surfaces;
an insert height axis ($A_H$) extending perpendicular to the insert thickness axis, and extending through the insert upper and lower surfaces;
an insert length axis ($A_L$) extending orthogonal to the insert thickness and height axes, and extending through the insert front and rear surfaces;
a length plane ($P_L$) defined by the insert length axis ($A_L$) and the insert height axis ($A_H$);
a thickness plane ($P_T$) defined by the insert thickness axis ($A_T$) and the insert length axis ($A_L$);
a height plane ($P_H$) defined by the insert height axis ($A_H$) and the insert thickness axis ($A_T$);
a maximum insert thickness measurable along the insert thickness axis;
a maximum insert height measurable along the insert height axis and being greater than the maximum insert thickness;
a maximum insert length measurable along the insert length axis and being greater than the maximum insert height;
the insert height axis ($A_H$) defining an upward direction ($D_U$) from the center of the insert towards the insert upper surface, and defining a downward direction ($D_D$) opposite to the upward direction;
the insert thickness axis ($A_T$) defining a first side direction ($D_{S1}$) from the center of the insert towards the insert first side surface, and defining a second side direction ($D_{S2}$) opposite to the first side direction;
the insert length axis ($A_L$) defining a forward direction ($D_F$) from the center of the insert towards the insert front surface, and defining a rearward direction ($D_R$) opposite to the forward direction;
the first corner comprising:
a cutting edge, and
a chip former arrangement formed at the upper surface;
the cutting edge comprising:
a first sub-edge extending along an intersection of the upper surface and the first side surface and following a straight line in a view along the second side direction ($D_{S2}$);
a second sub-edge extending along an intersection of the upper surface and the second side surface and following a straight line in a view along the first side direction ($D_{S1}$);
a third sub-edge extending along an intersection of the upper surface and the front surface;
a first corner edge connecting the first sub-edge the third sub-edge; and
a second corner edge connecting the second sub-edge the third sub-edge;
the chip former arrangement comprising:
a first chip surface adjacent to the first sub-edge and extending from the third sub-edge to a first rear chip edge, thereby defining a first cutting depth ($L_{C1}$);
a second chip surface adjacent to the first sub-edge and extending from the third sub-edge to a second rear chip edge, thereby defining a second cutting depth ($L_{C2}$);
a general cutting depth ($L_{GC}$) of the chip former arrangement being defined as (i) the smaller of the first and second cutting depths ($L_{C1}$, $L_{C2}$), or (ii) if the first and second cutting depths are equal, the depth of both the first and second cutting depths ($L_{C1}$, $L_{C2}$); and
a ridge connected to the first and second chip surfaces, and comprising a ridge front end proximate to the third sub-edge and a ridge rear end located further than the ridge front end from the third sub-edge, the ridge extending in the upward direction from the location of the upper surface where the ridge and the first and second chip surfaces connect;
wherein adjacent to the cutting edge the insert's first and second side surfaces and front surface are configured as relief surfaces by:
the first side surface tapering in a combined downward and second side direction;
the second side surface tapering in a combined downward and first side direction; and
the front surface tapering in a combined downward and rearward direction.
2. The insert according to claim 1, wherein in a view of the first cutting portion along the downward direction: one or both of the first and second corner edges comprises a wiper portion connected to the third sub-edge and extending in a straight line extending at a right angle with a nearer of the first and second sub-edges; and the third sub-edge is inwardly recessed relative to each wiper portion.

3. The insert according to claim 2, wherein each of the first and second corner edges comprises: said wiper portion, and a convexly shaped portion connected at a first end thereof to a nearer of the first and second sub-edges and at a second end thereof to said wiper portion.

4. The insert according to claim 1, wherein in a view of the first cutting portion along the downward direction, one or both of the first and second chip surfaces have a tapering shape.

5. The insert according to claim 4, wherein each tapering shape is wider adjacent to the third sub-edge than at another position spaced further apart from the third sub-edge.

6. The insert according to claim 1, wherein one or both the first and second chip surfaces have a planar shape.

7. The insert according to claim 1, wherein one or both the first and second chip surfaces form a side angle $\alpha$ with the thickness plane ($P_T$), the side angle $\alpha$ fulfilling the following condition: $-15° < \alpha < 15°$.

8. The insert according to claim 1, wherein the entire cutting edge lies in a cutting edge plane having a height of less than 150 microns.

9. The insert according to claim 1, wherein the insert is rotationally symmetric only at an angle of 180° about an axis parallel with the thickness axis ($A_T$) and extending through the center of the insert.

10. The insert according to claim 1, wherein the ridge comprises first and second side concave portions connecting the ridge to the chip surfaces, the first concave side portion opening up in the first side direction ($D_{S1}$) and the second concave side portion opening up in the second side direction ($D_{S2}$).

11. The insert according to claim 1, wherein the ridge front end comprises a concave front portion opening up in the forward direction ($D_F$).

12. The insert according to claim 1, wherein between the ridge front end and the third sub-edge, the chip former arrangement comprises an intermediary plateau no higher in the upward direction ($D_U$) than 100 microns above the first and second sub-edges.

13. The insert according to claim 12, wherein the intermediary plateau has a planar shape.

14. The insert according to claim 1, wherein, in view along the rearward direction ($D_R$), a width ($L_R$) of the ridge, at a height above the first and second side sub-edges, is less than half the overall thickness ($L_I$) between the first and second side sub-edges measured along the thickness axis ($A_T$).

15. The insert according to claim 1, wherein the ridge is elongated in a direction parallel to the insert length axis ($A_L$).

16. The insert according to claim 1, wherein a front spacing length ($L_{FS}$) between the third sub-edge and the ridge front end, measurable along the insert length axis ($A_L$), is at least 5% of the general cutting depth ($L_{GC}$).

17. The insert according to claim 16, wherein the front spacing length ($L_{FS}$) is defined as 10%±5% of the general cutting depth.

18. The insert according to claim 1, wherein in a view along each of the first and second insert side directions ($D_{S1}$, $D_{S2}$): the ridge has a basic convex shape; the ridge front end tapers in a combined forward and downward direction; and the ridge rear end tapers in a combined rearward and downward direction.

19. The insert according to claim 18, wherein: a rear edge plane ($P_{RE}$) is parallel to the height plane ($P_H$) and spaced apart from the third sub-edge by said general cutting depth ($L_{GC}$); and a rear spacing length ($L_{RS}$) between where the ridge rear end starts tapering in said combined rearward and downward direction, and the rear edge plane ($P_{RE}$), is at least 5% of the general cutting depth ($L_{GC}$).

20. The insert according to claim 19, wherein the rear spacing length ($L_{RS}$) is defined as 15%±10% of the general cutting depth ($L_{GC}$).

* * * * *